United States Patent
Rehfuss et al.

(10) Patent No.: US 6,258,898 B1
(45) Date of Patent: *Jul. 10, 2001

(54) AMINO RESINS FUNCTIONALIZED WITH CARBAMATE GROUPS AND COATING COMPOSITIONS CONTAINING THE SAME

(75) Inventors: John W. Rehfuss, West Bloomfield; Walter H. Ohrbom, Hartland Township; Donald L. St. Aubin, Commerce Township, all of MI (US)

(73) Assignee: BASF Corporation, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,476

(22) Filed: Dec. 23, 1996

(51) Int. Cl.$^7$ .................................................. C07C 271/12
(52) U.S. Cl. .......................... 525/518; 525/509; 525/519; 525/520; 528/254; 528/258; 528/262; 528/266; 528/267; 528/269; 560/157; 560/158; 560/165
(58) Field of Search ..................................... 525/509, 518, 525/519, 520; 528/266, 267, 269, 254, 258, 262; 560/157, 158, 165

(56) References Cited

U.S. PATENT DOCUMENTS

| | | | | |
|---|---|---|---|---|
| 3,464,938 | * | 9/1969 | Nordstrom | 525/159 |
| 4,543,276 | * | 9/1985 | Parekh | 525/517 |
| 5,336,566 | * | 8/1994 | Rehfuss | 525/509 |
| 5,356,669 | | 10/1994 | Rehfuss et al. . | |
| 5,373,069 | * | 12/1994 | Rehfuss | 525/456 |
| 5,512,639 | * | 4/1996 | Rehfuss | 525/456 |

FOREIGN PATENT DOCUMENTS

| | | | |
|---|---|---|---|
| 0 624 577 A1 | 5/1994 | (EP) | C07D/251/70 |
| WO 96/11915 | 9/1994 | (WO) | C07D/251/70 |
| WO 96/04258 | 7/1995 | (WO) | C07D/251/70 |

OTHER PUBLICATIONS

Von Klaus Hübner & Fritz Kollinsky, Chemical Abstract, N–(Alkoxymethyl)Acrylamides, and pp. 1–3 and 1–18.

* cited by examiner

Primary Examiner—Patricia A. Short
(74) Attorney, Agent, or Firm—Anne Gerry Sabourin

(57) ABSTRACT

A crosslinking agent comprising one or more carbamate groups or groups convertible to carbamate and two or more polyfunctional amino moieties having the formula

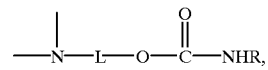

wherein L is selected from the group consisting of alkyl or aryl, cycloalkyl and alkylaryl having a carbon chain length between 1 and 6 carbon atoms and N is a polyfunctional amino moiety. L may also have additional bridging groups such as esters, ethers, ureas, or urethanes groups. Also included is a method of making the crosslinker, a coating composition containing the crosslinker and a method for coating a substrate with the composition.

8 Claims, No Drawings

AMINO RESINS FUNCTIONALIZED WITH CARBAMATE GROUPS AND COATING COMPOSITIONS CONTAINING THE SAME

FIELD OF THE INVENTION

The present invention relates to carbamate-functional crosslinking agents and coating compositions containing these crosslinking agents, particularly to topcoat or clearcoat coating compositions having carbamate-functional crosslinking agents based upon polyfunctional amino compounds.

BACKGROUND OF THE INVENTION

Coatings are often applied in multiple layers that may include, for instance, one or more primer layers and one or more topcoat layers. Topcoats may be used to provide color and other aesthetic properties. Topcoats commonly are applied as either one layer as a color coat, for example the well-known acrylic enamels, or in two layers as a color coat with a clear overcoat. Color-plus-clear composite coatings are widely used, especially in the automotive industry, because of their exceptional appearance. Automotive coatings requirements are particularly stringent. Automotive coatings must not only have the desirable appearance properties of high gloss, depth of color, distinctiveness of image, and so on. Topcoats must also be resistant to marring, scratching, etching or spotting from environmental depositions, chalking, and other forms of film degradation. In a color-plus-clear composite coating, it is particularly critical to have a clearcoat that is resistant to film degradation.

Rehfuss et al. disclose in U.S. Pat. Nos. 5,356,669 and 5,474,811, the disclosure of which is incorporated herein by reference, clearcoat compositions comprising carbamate-functional polymers that may be cured by reaction with compounds having a plurality of carbamate-reactive groups.

Carbamate-functional reactive diluents are described in WO 87/00851, Hoy et al.; U.S. Pat. No. 5,115,015, Richey, Jr., et al.; U.S. Pat. No. 4,814,382, Hoy et al.; U.S. Pat. No. 4,677,168, Hoy et al.; and U.S. Pat. No. 4,520,167, Blank et al., the disclosures of which are incorporated herein by reference. The carbamate-functional reactive diluents are low molecular weight compounds with one carbamate group. Because of their monofunctionality, such compounds cannot be used as crosslinking agents in coating compositions.

Di-carbamate-functional crossinking agents based upon a carbamate functional polymers are disclosed in Rehfuss, U.S. Pat. No. 5,373,069, the disclosure of which is incorporated herein by reference.

Tri-carbamate-functional crosslinking agents based upon isocyanurate-type materials are disclosed in Rehfuss, U.S. Pat. No. 5,336,566, the disclosure of which is incorporated herein by reference. These materials have a cyanuric ring nucleus and three primary carbamate terminal groups.

Alkoxycarbonylamino-1,3,5-triazine crosslinking agents are disclosed in U.S. Pat. No. 4,939,213; U.S. Pat. No. 5,084,541; U.S Pat. No. 5,288,865; Kuang et al., WO 96/15185; Flood et al., WO 96/04258; Bay, WO 96/11915; and Flood et al., EP 0 624 577, the disclosures of which are incorporated herein by reference. The crosslinking agent described in these references have secondary carbamate groups on the amino group that react with alcohols or other active hydrogen-containing materials. The mechanism for the reaction is thought to involve loss of alcohol from the carbamate crosslinking agent and then formation of a urethane bond with the active hydrogen-containing material.

It has now been discovered that carbamate-functional crosslinking agents can be synthesized based upon polyfunctional amino compounds. The compositions of the present invention include primary or secondary carbamate-functional crosslinking agents based upon polyfunctional amino compounds in combination with binder resins, such as addition polymers, or aminoplast resins and materials that have at least two groups reactive with carbamate functionality. The coatings formed from the compositions of the present invention have crosslinked networks with urethane linkages. These linkages have been shown to be durable, and environmental etch-resistant, as discussed in Rehfuss et al. disclose in U.S. Pat. Nos. 5,356,669 and 5,474,811.

SUMMARY OF THE INVENTION

According to the present invention, there is provided a carbamate-functional crosslinking agent based on polyfunctional amino compounds and a curable coating composition comprising the carbamate-functional crosslinking agent. The crosslinking agent comprises one or more carbamate groups or groups convertible to carbamate and one or more polyfunctional amino moieties and has the formula

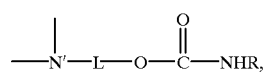

wherein L is alkyl, aryl, cycloalkyl or alkylaryl the alkyl group having a carbon chain length between 1 and 6 carbon atoms. L may also have additional bridging groups such as esters, ethers, ureas, or urethanes groups. R is hydrogen, alkyl or cycloalkyl the alkyl group having a carbon chain length of between 1 and 6 carbon atoms, and N' is a polyfunctional amino moiety.

The polyfunctional amino moiety may be primary or secondary amine, alkylol amine, or alkoxy amine groups. It is thought that coatings utilizing the present primary carbamate-functional crosslinking agents based on amino resins offer an advantage over crosslinking agents such as those disclosed in WO 96/15185 because in the latter the proximity of the triazine ring activates cured linkage formed with the principal resin, making degradation of the crosslink bond more likely.

DETAILED DESCRIPTION

The carbamate-functional crosslinking agents comprising a polyfunctional amino moiety according to the invention may be formed from any amino moiety or aminoplast or any mixture thereof that has, on average per molecule, more than one amine groups, alkoxylated amine groups, alkoxylated amine groups, or any mixture of these three groups.

Aminoplasts are well-known as a class of materials and there are many aminoplasts commercially available, for example from Cytec Industries, Inc., West Paterson, N.J. under the trade names CYMEL® and BEETLE®, or from Monsanto Corporation, ADDRESS, under the trade name RESIMENE®. The amino moiety may comprise ureas, thioureas, melamines, benzoguanamines, dihydroxyethyleneureas, acetoguanamines, alkoxy nitrites, cyclohexylcarboguanamines, N,N'-dimethylureas, acetylenediureas, amides, dicyandiamides, guanyl ureas, glycolurils, and the like, the products of these materials with aldehydes such as formaldehyde, and condensates thereof. Other triazines, triazoles, diazines, guanidines, substituted ureas, or guanamines may also be used.

As mentioned, the amino moiety may be partially or fully converted to alkylol groups by reaction with an aldehyde. Formaldehyde is usually employed, but other aldehydes such as acetaldehyde, paraformaldehyde, trioxane, crotonaldehyde, and benzaldehyde are also useful. The amine-formaldehyde resin is manufactured in a known manner by acid-catalyzed condensation, preferably using aqueous formaldehyde. In a preferred embodiment, the modified amino-triazine-aldehyde resin is used, such as those described in U.S. Pat. No. 3,082,180, the disclosure of which is incorporated herein by reference.

It is also possible to partially or substantially fully etherify the alkylol groups using one or more monofunctional alcohols, for example methanol, ethanol, propanol, isopropanol, butanol, isobutanol, tert-butanol, or benzyl alcohol. One preferred group of amino compounds is that of substantially fully methylated, fully methylolated melamines, which may, for example, be manufactured according to the process disclosed in U.S. Pat. No. 4,293,692, the disclosure of which is incorporated herein by reference. Another useful kind of amino compound are fully mixed-alkylated, substantially fully methylolated glycoluril derivatives such as dimethoxymethyl diethoxymethyl glycoluril, as described in US. Pat. No. 4,105,708, the disclosure of which is incorporated herein by reference.

The amino resin may also be the product of the reaction of a hydrogen on the amino group with an epoxy, or the exchange product of a functionalized amine, such as 5-aminohexanol with melamine.

It is especially preferred that the amino moiety be melamine, urea, urea containing compounds, melamine-formaldehyde, and glycoluril-formaldehyde. The melamine-formaldehyde and glycoluril-formaldehyde may be partially or substantially fully alkylated and methylolated. Thus, the preferred compounds may have unmodified amino groups, methylol groups, ether groups, and any combination of mixtures of these groups. Particular preferred examples are melamine, hexamethylol melamine, pentamethylol melamine, tetramethylol melamine, trimethylol melamine, dimethylol melamine, and monomethylol melamine; and partially or substantially fully alkylated derivatives thereof, such as hexamethoxymethyl melamine.

Carbamate groups may be generalized by the structure

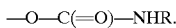

—O—C(=O)—NHR.

The carbamate-functional crosslinking agents based upon polyfunctional amino compounds are formed by reacting the aminoplast or amino moiety with a compound that has one or more carbamate groups or with a compound that has one or more groups that can be converted to carbamate groups.

Groups that can be converted to carbamate groups include cyclic carbonate groups, epoxy groups, and unsaturated bonds. Cyclic carbonate groups may be converted to carbamate groups by reaction with ammonia or primary amine to form a β-hydroxy carbamate. Epoxy groups may be converted into a cyclic carbonate by reaction with $CO_2$, followed by conversion to the β-hydroxy carbamate. The conversion of the oxirane group to a cyclic carbonate may be done at any pressure from atmospheric pressure up to supercritical $CO_2$ pressures, preferably at from about 60 to about 150 psi, and at temperatures from about 60° C. to about 150° C. Useful catalysts include any that activate an oxirane ring, such as tertiary amine or quaternary amine salts, for example tetramethyl ammonium bromide; combinations of complex organo tin halides and alkyl phosphonium halides, for example tetramethyl tin iodide, tetrabutyl tin iodide, tetrabutyl phosphonium iodide, and tetramethyl phosphonium iodide; potassium salts, for example potassium carbonate and potassium iodide, preferably in combination with crown ethers; tin octoate, calcium octoate, and the like.

Unsaturated bonds can be converted to carbamate groups by reaction with peroxide to generate an epoxy group, then conversion of the epoxy group to a carbonate group, and finally conversion to the carbamate group according to the procedures described above. The carbamate is primary or secondary terminating in an NR group, where R is H, alkyl or cycloalkyl having between 1 and 6 carbon atoms and may be substituted or unsubstituted.

In a useful synthesis of the carbamate functional compounds of the invention, a methylol group of the amino resin may be reacted with urea or cyanic acid at an elevated temperature, preferably also with a catalyst, to form a primary carbamate group. A carbamate group may also be formed by reaction of an alcohol with phosgene, and then with ammonia or amine to form a carbamate group. An alkoxylated amino compound may be reacted with a hydroxy alkyl carbamate. Yet another approach is to react an isocyanate half-capped with a hydroxy carbamate, such as hydroxypropyl carbamate, with an alcohol group on the amino resin. A third technique is esterification of an alcohol with an alkyl carbamate. Carbamate compounds having lower alkyl groups are preferred for transesterification. The esterification may be catalyzed by Lewis acids, tin, or titanate catalysts. Examples of useful catalysts include, without limitation, dibutyltin dilaurate, dibutyltin oxide, and isobutoxy titanate. The reaction may be also catalyzed by Brönsted acids, such as paratoluene sulfonic acid.

By another method, an alkoxylated amino resin may be reacted with glycerin carbonate. The carbonate ring then may be opened with ammonia or amine to form a beta hydroxy carbamate. Alternatively, the carbonate ring may be opened with a primary or secondary amine and then converted to a carbamate group by any of the methods described herein.

By another method, an exchange reaction between the amino groups on the amino resin and an amine containing a functional group that can be converted into a carbamate group is carried out. The functional group is then converted into a carbamate group. A non-limiting example of this is the exchange reaction of melamine with an amino-alcohol, such as 1-aminohexanol, followed by reaction with phosgene, then ammonia or amine.

Finally, carbamates may be prepared by transcarbamylation of an alcohol with an alkyl carbamate, for example methyl carbamate, ethyl carbamate, or butyl carbamate, to form a carbamate group on the amino resin. The transcarbamylation is preferably carried out at an elevated temperature and preferably in the presence of a catalyst such as an organometallic catalyst, e.g., dibutyltin dilaurate.

Another class of compounds useful as the carbamate functional crosslinker include polycarbamate and alkoxylated polycarbamate resins available under the trade name PLASTOPAL® from BASF Corporation, Mt. Olive, N.J. In particular, preferred compounds include dicarbamates, alkylolated or alkoxylated dicarbamates, or dicarbamates with mixtures of these groups. Preferred compounds are of the formulas

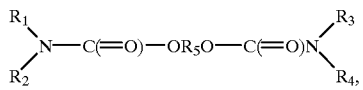

wherein $R_1$, $R_2$, $R_3$, and $R_4$ are each independently selected from the group consisting of H, $R_6$OH, and $R_6OR_7$, wherein $R_6$ is alkyl group of up to 6 carbon atoms and $R_7$ is alkyl of up to 6 carbon atoms; and further wherein $R_5$ is alkylene of up to 20 carbon atoms.

In a preferred embodiment, the alkoxylated polycarbamate resin is selected from those etherified with isobutanol, n-butanol, or methanol. Examples of suitable compounds or resin include, without limitation, Plastopal BTB, Plastopal BTA, Plastopal BTM, and Plastopal LR 8822, all commercially available from BASF Corporation, Mt. Olive, N.J.

If a polycarbamate is used, the amino groups may be partially or fully converted to alkylol groups by reaction with an aldehyde. Formaldehyde is usually employed, but other aldehydes such as acetaldehyde, paraformaldehyde, trioxane, crotonaldehyde, and benzaldehyde are also useful. The amine-formaldehyde resin is manufactured in a known manner by acid-catalyzed condensation, preferably using aqueous formaldehyde.

It is also possible to partially or substantially fully etherify the alkylol groups using one or more monofunctional alcohols, for example methanol, ethanol, propanol, isopropanol, butanol, isobutanol, tert-butanol, or benzyl alcohol. One preferred group of amino resins is that of substantially fully methylated, fully methylolated polycarbamate resins. Another useful kind of amino resin is fully mixed-alkylated, substantially fully methylolated polycarbamate resins.

The carbamate functional compound is combined in the coating composition of the invention with an aminoplast resin, material, or an amino polymer having more than one group reactive with carbamate functionality. The resin, material, or polymer having more than one group reactive with carbamate functionality may be any resin of the type known to be useful in coating compositions. Preferably, especially for automotive coatings, at least one resin is used from the group of polyesters, polyurethanes, addition polymers, polyester polyurethane graft copolymers, aminoplasts and mixtures of these. It is particularly preferred to use addition polymers that have one or more primary carbamate-reactive functional groups. Such addition polymers include, without limitation, acrylic polymers, vinyl polymers such as copolymers of vinyl esters, and the like. Of these, acrylic polymers and mixtures that include acrylic polymers are particularly preferred as the resin having at least two primary carbamate-reactive functional groups. Alternatively, aminoplast resins may used, where melamine resins are the preferred aminoplast. The carbamate-reactive groups are preferably isocyanate, anhydride, siloxane, or alkoxylated amino groups.

These materials may be cured by themselves, or in combination with other crosslinking moieties. These other crosslinking moieties may or may not be reactable with the carbamate or carbamate crosslinking species. They may be on separate materials or covalently bonded to one or more parts of the carbamate functional amino crosslinker and/or the group reactable with the carbamate functional amino crosslinker. A non-limiting example of this is the addition of a epoxy functional resin with an acid functional resin. Another non-limiting example is the addition of the alkoxycarbonylamino-1,3,5-triazine crosslinking agent disclosed in U.S. Pat. No. 4,939,213 and a hydroxy functional acrylic resin.

When the carbamate reactive material is an addition polymer with at least two carbamate reactive functional groups, the preferred addition polymers may be formed by including monomers such as, without limitation, alkoxylated acrylamides and alkoxylated methacrylamides, such as N-butoxy methacrylamide, N-methoxy methacrylamide, and N-isobutoxy methacrylamide; alkyl acrylamidoglycolate alkyl ethers and related esterified, etherified acrylamide or methacrylamide derivatives, including methyl acrylamidoglycolate methyl ether (sold under the trade name MAGME by Cytec Industries, Stamford, Conn.) and butyl acrylamidoglycolate methyl ether; alkoxylated urea acrylates and methacrylates, such as hydroxyethylethylene urea methacrylate (HEEU esterified with methacrylic acid, commercially available as Norsocryl 100 from Elf Atochem), followed by reaction with an aldehyde; isocyanate-functional monomers, such as meta-isopropenyl-α, α-dimethylbenzyl isocyanate (commercially available under the trade name TMI®, from Cytec Industries, Stamford, Conn.), isocyanato ethyl methacrylate (available commercially from Dow Corp., Midland, Mich.); anhydride-functional monomers, such as maleic anhydride; and siloxane monomers or polysiloxane macromonomers, such as those available commercially from Huls. Examples of useful alkoxylated amides include, without limitation, such compounds as N-(1,1-dimethyl-3-oxobutyl)-acrylamide, N-alkoxy amides such as methylolamides; N-alkoxy acrylamides such as n-butoxy acrylamide; N-aminoalkyl acrylamides or methacrylamides such as aminomethylacrylamide, 1-aminoethyl-2-acrylamide, 1-aminopropyl-2-acrylamide, 1-aminopropyl-2-methacrylamide, N-1-(N-butylamino)propyl-(3)-acrylamide and 1-aminohexyl-(6)-acrylamide and 1-(N,N-dimethylamino)-ethyl-(2)-methacrylamide, 1-(N,N, dimethylamino)propyl-(3)-acrylamide and 1-(N, N-dimethylamino)-hexyl-(6)-methacrylamide. MAGME-containing acrylic copolymers are described in Howard R. Lucas, *Effect of α-Methyl Groups on Room Temperature Crosslinking in Acrylic Polymers Containing MAGME Monomers*, Journal of Coatings Technology, Vol. 57, No. 731 at 49 (December 1985), the disclosure and cited references of which are incorporated herein by reference. Polymers of N-(alkoxymethyl)acrylamides are described in many references, including Christenson, et al., U.S. Pat. No. 3,079,434; Tucker, U.S. Pat. No. 3,326,868; Flegenheimer, U.S. Pat. No. 3,344,097; and Christenson et al., U.S. Pat. No. 3,247,139, each of which is incorporated herein by reference.

The unsaturated monomer having a carbamate-reactive functional group may be polymerized along with one or more unsaturated copolymerizable monomers known in the art. Such copolymerizable monomers include, without limitation, α,β-ethylenically unsaturated monocarboxylic acids containing 3 to 5 carbon atoms and the esters or nitrites of those acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds.

Representative examples of useful esters of acrylic, methacrylic, and crotonic acids include, without limitation, such compounds as alkyl and substituted alkyl esters of said acids, particularly those from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates and methacrylates; and polyalkylene glycol acrylates and methacrylates Representative examples of other ethylenically unsaturated polymerizable monomers include, without limitation, such compounds as fumaric, maleic, and itaconic anhydrides, half esters, and esters.

Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone.

Representative examples of aromatic or heterocyclic aliphatic vinyl compounds include, without limitation, such compounds as styrene, α-methyl styrene, vinyl toluene, t-butyl styrene, and 2-vinyl pyrrolidone.

Other suitable copolymerizable monomers include α-olefin compounds such as ethylene, propylene; diene compounds such as butadiene and isoprene; and compounds with fluorine or silicon atoms, such as 1H,1H,5H-octafluoropentyl acrylate and trimethylsiloxyethyl acrylate.

The addition copolymers are preferably acrylic polymers. For purposes of this invention, acrylic polymers are defined as polymers that include one or more α,β-ethylenically unsaturated monocarboxylic acids containing 3 to 5 carbon atoms or derivatives of those acids, such as the esters named above. The preferred acrylic polymers may be prepared by using conventional techniques, such as free radical polymerization, cationic polymerization, or anionic polymerization, in, for example, a batch or semi-batch process. For instance, the polymerization may be carried out by heating the ethylenically unsaturated monomers in bulk or in organic solution or aqueous dispersion in the presence of a free radical source, such as an organic peroxide or azo compound and, optionally, a chain transfer agent for a batch process; or, alternatively, the monomers, initiator(s), and any chain transfer agent may be fed at a controlled rate into a heated reactor charged with solvent in a semi-batch process.

Typical free radical sources are organic peroxides, including dialkyl peroxides, such as di-tert-butyl peroxide and dicumyl peroxide, peroxyesters, such as tert-butyl peroxy 2-ethylhexanoate and tert-butyl peroxy pivalate; peroxydicarbonates, such as di-2-ethylhexyl peroxydicarbonate and dicyclohexyl peroxydicarbonate; diacyl peroxides, such as dibenzoyl peroxide and dilauroyl peroxide; hydroperoxides, such as cumene hydroperoxide and tert-butyl hydroperoxide; ketone peroxides, such as cyclohexanone peroxide and methylisobutyl ketone peroxide; and peroxyketals, such as 1,1-bis(tert-butyl peroxy)-3,5,5-trimethylcyclohexane and 1,1-bis(tert-butyl peroxy) cyclohexane; as well as azo compounds such as 2,2'-azobis(2-methylbutanenitrile) and 1,1'-azobis (cyclohexanecarbonitrile). Typical chain transfer agents are mercaptans such as octyl mercaptan, n- or tert-dodecyl mercaptan, thiosalicylic acid, mercaptoacetic acid, and mercaptoethanol; halogenated compounds; and dimeric alpha-methyl styrene.

The free radical polymerization is usually carried out at temperatures from about 20° C. to about 200° C., preferably from 90° C. to 170° C. The reaction may conveniently be done at reflux, although reflux is not required. The initiator should be chosen so its half-life at the reaction When the resin having at least two groups reactive with carbamate functionalities is an acrylic polymer, the polymer will generally have a number average molecular weight of from about 1000 to about 40,000, preferably from about 1000 to about 6000, and even more preferably from about 1000 to about 3000. The molecular weight can be determined by gel permeation chromatography using a polystyrene standard. The equivalent weight will generally be between about 200 and 1500, and more preferably it will fall between about 300 and 340. The glass transition temperature can be adjusted according to methods well-known in the art through selection and apportionment of the comonomers. In a preferred embodiment, the $T_g$ of the acrylic having carbamate-reactive functionality may be between about −20° C. and 80° C., more preferably between about 20° C. and 60° C.

It is also possible, and in some cases may be preferred, to form the resin having at least two groups reactive with carbamate functionality by adducting a pre-formed polymer or resin with a compound having carbamate-reactive functionality. For example, a compound having at least one isocyanate group, anhydride group, alkoxylated amino group, or siloxane group, along with at least one group reactive with functionality on the polymer or resin, may be used. In a preferred synthesis of the polymer or resin having at least two groups reactive with carbamate functionality, an acid-functional polymer or resin is reacted with hydroxyethylethylene urea, which is then reacted with an aldehyde. Other combinations of adducting compound and functional polymer or resin that will result in a polymer or resin having at least two groups reactive with primary carbamate functionality are contemplated and are known to the skilled artisan.

The coating compositions of the invention include at least one of the carbamate-functional crosslinking agents of the invention and at least one polymer or resin having at least two groups reactive with carbamate functionality. The carbamate-functional crosslinking agent may be included in an amount of from about 10 percent by weight to about 90 percent by weight, preferably from about 20 percent by weight to about 80 percent by weight, based upon the total weight of the composition, excluding solvents. In a particularly preferred embodiment, the carbamate-functional crosslinking agent is included in an amount of from about 30 percent by weight to about 70 percent by weight, based upon the total weight of the composition, excluding solvents. The polymer or resin having at least two groups reactive with primary carbamate functionality may be included in an amount of from about 10 percent by weight to about 90 percent by weight, preferably from about 20 percent by weight to about 80 percent by weight, based upon the total weight of the composition, excluding solvents. In a particularly preferred embodiment, polymer or resin having at least two groups reactive with primary carbamate functionality is included in an amount of from about 30 percent by weight to about 70 percent by weight, based upon the total weight of the composition, excluding solvents.

The compositions may include one or more catalysts, and preferably include at least one catalyst for the crosslinking reaction. Useful catalysts include, without limitation, reaction. Useful catalysts include, without limitation, alkylsulfonic acid, arylsulfonic acids, and alkylaryl sulfonic acids, such as methane sulfonic acid, p-toluene sulfonic acid, and dodecylbenzene sulfonic acid; dinonylnaphthalene disulfonic acids; phosphoric acid and its esters, such as phenyl acid phosphate, hydroxy phosphate ester, and butyl phosphate; Lewis acids such as boron trifluoride etherate, trimellitic acid, monobutyl maleate, triflic acid; and so on. When a catalyst is included, the catalyst is used at levels of from about 0.01 percent by weight to about 2.0 percent by weight, preferably from about 0.05 percent by weight to about 1.0 percent by weight, based upon total weight of the coating composition.

Although the coating compositions of the present invention may be used as powder coatings, in a preferred embodiment the coating compositions further include organic solvents or water. In one highly preferred embodiment, the compositions are solventborne coating compositions. The organic solvent may be present in an amount of from about 5 percent to about 99 percent by weight, preferably from about 20 percent to about 80 percent by weight, and more preferably from about 20 percent to about 50 percent by weight of the coating composition.

The selection of particular solvents may be made according to methods well-known in the art. The optimum solvent or mixture of solvents may be arrived at by straightforward testing of the particular mixture. In general, useful solvents will include, without limitation, esters, particularly acetates, propionates, and butyrates, alcohols, ketones, aromatic solvents, glycol ethers, and glycol esters. Non limiting examples of useful solvents include methyl ethyl ketone, methyl isobutyl ketone, amyl acetate, butyl acetate, ethylene glycol butyl ether, propylene glycol methyl ether acetate, xylene, toluene, isopropanol, butanol, naphtha and other blends of aromatic hydrocarbons, N-methylpyrrolidone, butyl acetate, and isobutyl isobutyrate. The particular type or types of solvent used and the optimum levels depend upon the specific binder and crosslinking agent in the coating composition. Selection and apportionment of the solvents may be done by straightforward testing.

The compositions according to the invention may also be waterborne compositions. In waterborne compositions, water may be included in an amount of from about 20 percent by weight to about 95 percent by weight, preferably from about 30 percent by weight to about 70 percent by weight of the coating composition. Waterborne compositions preferably also include one or more organic cosolvents, such as butyl cellosolve, cellosolve acetate, or Texanol, at levels of from about 1 percent by weight to about 20 percent by weight, preferably from about 5 percent by weight to about 10 percent by weight, based upon total coating composition weight.

Any of the customary additives may be included in the coating compositions of the invention, including, without limitation, surfactants, fillers, stabilizers, wetting agents, dispersing agents, adhesion promoters, UV absorbers, antioxidants, hindered amine or amide light stabilizers, rheology control additives such as thixotropes, leveling agents, slip agents, surfactants, waxes, reactive diluents, waxes, anti-cratering additives, and so on. The amounts and combinations of such additives may be determined according to the usual methods employed in the art.

The composition may include additional crosslink technologies, that may or may not react with the carbamate or the carbamate reactable functional groups. These additional crosslink technologies may be separate or covalently bonded to one or more parts of the carbamate functional amino crosslinker and/or the group reactable with the carbamate functional amino crosslinker. A non-limiting example of this is the addition of a epoxy functional resin with an acid functional resin. Another non-limiting example is the addition of the alkoxycarbonylamino-1,3,5-triazine crosslinking agent disclosed in U.S. Pat. No. non-limiting example, the carbamate functional crosslinker is cured with a mixture of melamine based aminoplast, such as monomeric hexamethoxymethyl melamine and an isobutoxy methyl acrylamide acrylic resin.

The coating compositions of the invention may be applied according to the usual techniques, such as, for example, spray coating, including electrostatic coating methods, dip coating, roll coating, curtain coating, and so on. For automotive body panels, spray coating methods are preferred.

The coating compositions of the invention may be applied to many different kinds of substrates, including, without limitation, metallic, plastic, ceramic, paper, leather, and wood and wood-like substrates. Preferably, the compositions of the invention are applied over a primer layer.

When the coating compositions according to the inventions are used as a pigmented topcoat, the pigment may be any organic or inorganic pigment or dye, filler, metallic or other flake pigment, or combination thereof. The flake pigment may be, for example, mica or aluminum flake. Pigments are usually used in topcoat compositions at levels of from about 0.1 to about 1.0 as a pigment to binder ratio.

In one preferred embodiment, the composition of the invention may be used as the clearcoat layer over a pigmented basecoat as part of a composite color-plus-clear coating. The pigmented basecoat is preferably applied over a primer layer. Pigmented basecoat compositions for such composite coatings are well-known in the art and are described in detail in many patents and elsewhere. Polymers known in the art to be useful in basecoat compositions include acrylics, vinyls, polyurethanes, polycarbonates, polyester, alkyds, and polysiloxanes. Preferred polymers include acrylics and polyurethanes. Basecoat compositions are preferably thermosetting compositions that cure to an insoluble, crosslinked coating layer. Wet-on-wet base/clear systems, in which the clearcoat composition is applied to the basecoat composition before the latter is cured, are preferred.

After the article is coated with at least the composition of the invention having carbamate-functional crosslinking agent based upon amino resin, the coated article may be subjected to conditions so as to cure the coating layer or layers. Although various methods of curing may be possible, heat-curing is the usual and preferred method. Generally, heat curing may be effected by exposing the coated article to elevated temperatures provided, for example, by radiative heat sources. The cure temperature is preferably from about 180° F. to about 310° F., and more preferably from about 250° F. to about 285° F. The article may be cured for a time from about 15 to about 45 minutes, preferably from about 20 to about 30 minutes.

The invention is further described in the following examples. The examples are merely illustrative and do not in any way limit the scope of the invention as described and claimed. All parts are parts by weight unless specifically stated otherwise.

EXAMPLES

Example 1. Carbamate Functional Crosslinking Agent Based Upon Hexamethoxymethyl Melamine.

A. Preparation of Hydroxyl Functional Melamine

A mixture of 914 parts by weight of CYMEL® 303 (available from Cytec Industries, Stamford, Conn.), 826.8 parts of hydroxypropyl carbamate, and 1000 parts of methanol was heated to 69° C. under an inert atmosphere. A total of 12 parts of dodecylbenzene sulfonic acid was added to the mixture. The reaction mixture was held under 70° C. until all of the hydroxypropyl carbamate had been incorporated into the melamine. At that point, 379.5 parts of methyl carbamate was added to the mixture. The mixture was heated to reflux and the reflux maintained until again, the methyl carbamate was no longer being incorporated.

Following addition of 3.5 parts of AMP-95 (aminomethyl propanol, 95%, available commercially from Angus Chemical Corp., Buffalo Grove, Ill.), the reaction mixture was vacuum stripped to remove unreacted methyl carbamate. Following the vacuum stripping, 882 parts by weight of amyl acetate was added. The resulting resin solution had a hydroxyl equivalent weight of 348 g./equiv. on solution.

B. Preparation of Carbamate-Functional Melamine

A mixture of 68 parts by weight of isophorone diisocyanate, 73.6 parts by weight of methyl isoamyl ketone, and 0.2 parts by weight of dibutyltin dilaurate was formed, and to this mixture 36.5 parts by weight of hydroxypropyl carbamate were added slowly. During the addition, the reaction temperature is not allowed to go above 39° C. After it was determined that the hydroxypropyl carbamate had been incorporated by NCO titration with dibutyl amine, 110.5 parts by weight of the hydroxyl functional melamine of Part A was added. The reaction mixture was heated to 65° C. until all of the isocyanate was consumed, as determined by titration with dibutyl amine. The reaction mixture was cooled and 28 parts by weight of n-butanol were then added.

C. Cure of Carbamate Functional Crosslinking Agent Based Upon Hexamethoxymethyl Melamine A mixture of 52.8 parts by weight of the product carbamate-functional melamine of Part B, 3.9 parts by weight of hexamethoxymethyl melamine, and 0.3 parts by weight of dodecylbenzene sulfonic acid was drawn down on glass at a thickness of 8 millimeters. The draw down was baked in an oven at 285° F. for 30 minutes. The cured coating layer was hard and clear. The cured coating layer was soaked for one minute in methyl ethyl ketone with no observable effect. The cured coating layer was also tested with 200 double rubs with methyl ethyl ketone with no observable effect.

Example 2. Carbamate Functional Crosslinking Agent Based Upon Hexamethoxymethyl Melamine.

A. Preparation of Carbamate Functional Melamine

In a suitable reactor, a mixture of 400 parts by weight of monomeric hexamethoxymethyl melamine, 318 parts of hydroxypropyl carbamate, 300 parts by weight of butyl carbamate, and a catalytic amount of zinc nitrate was heated slowly to 60° C. under an inert atmosphere. Vacuum was applied to the reaction mixture to remove the reaction by-product of methanol. When the reaction mixture reached 100° C., the temperature was maintained at about 100° C. until the calculated weight of methanol had been removed.

At this point, 500 parts by weight of toluene, 260 parts by weight of methyl carbamate, and a catalytic amount of dibutyltin oxide were added to the reactor. The reaction mixture was heated to reflux. The by-product of the transcarbamation reaction, methanol, was removed. The progress of the reaction was monitored by titration of hydroxyl functionality. When the hydroxyl concentration had decreased less than 10% of its initial level, the batch was vacuum stripped of solvent and unreacted materials. The viscosity of the product resin was adjusted by addition of 104 parts by weight of Dowanol® PM (available from Dow Corp., Midland, Mich.

B. Cure of Carbamate Functional Crosslinking Agent Based Upon Hexamethoxymethyl Melamine A mixture of 120 parts by weight of the product carbamate-functional melamine of Part A, 14.5 parts by weight of hexamethoxymethyl melamine, 35 parts by weight of Dowanol® PM, and 1.0 parts by weight of oxazolidinone blocked dodecylbenzene sulfonic acid was drawn down on glass at a thickness of 8 millimeters. The draw down was baked in an oven at 275° F. for 25 minutes. The cured coating layer was hard and clear. The cured coating layer was soaked for one minute in methyl ethyl ketone with no observable effect. The cured coating layer was also tested with 200 double rubs with methyl ethyl ketone with no observable effect.

Example 3. Coating Composition Containing Carbamate Functional Crosslinking Agent Based Upon Hexamethoxymethyl Melamine A. Preparation of N-Isobutoxymethacrylamide Polymer In a suitable vessel equipped with a condenser, 1125 parts by weight of isobutyl alcohol was heated to reflux nitrogen. Once at reflux, the nitrogen was turned off and a mixture of 988 parts of N-isobutoxymethacrylamide, 748 parts of styrene, 747 parts of 2-ethylhexyl acrylate, 248 parts of VAZO-67 (available from DuPont de Nemours, Inc., CITY, ST), and 115 parts of isobutanol was added over two hours. All parts are by weight. After the addition was completed, 200 parts of isobutanol was added. The reflux was maintained for an additional 30 minutes.

B. Preparation of Coating Composition

A mixture was formed from 35.6 parts by weight of the carbamate-functional melamine of Example 1, Part B, 27.2 parts by weight of the N-isobutoxymethacrylamide polymer of Example 3, Part A, and 0.19 parts by weight of dodecylbenzene sulfonic acid. The mixture was drawn down on glass at a thickness of 8 millimeters. The draw down was baked in an oven at 285° F. for 30 minutes. The cured coating layer was hard and clear. The cured coating layer was soaked for one minute in methyl ethyl ketone with no observable effect. The cured coating layer was also tested with 200 double rubs with methyl ethyl ketone with no observable effect.

The invention has been described in detail with reference to preferred embodiments thereof. It should be understood, however, that variations and modifications can be made within the spirit and scope of the invention.

We claim:

1. A crosslinking agent comprising a polyfunctional amino moiety having thereon one or more carbamate groups having the formula

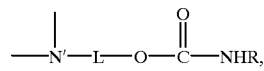

N' is a polyfunctional amino moiety selected from the group consisting of urea, substituted triazines, triazoles, diazines, guanamines, guanadines, amides, melamines, alkoxynitriles, and the reaction products of these compounds with aldehydes, and condensates thereof, wherein L comprises an alkyl group having a carbon chain length between 1 and 6 carbon atoms and R is hydrogen.

2. The crosslinking agent of claim 1 wherein the polyfunctional amino moiety is selected from the group consisting of benzoguanamines, acetoguanamines, cyclohexylcarboguanamines, alkoxynitriles, dicyandiamides, glycolurils, melamines, and amides.

3. The crosslinking agent of claim 1 wherein the polyfunctional amino moiety comprises an alkoxylated aminoplast or amino resin.

4. The crosslinking agent of claim 1 wherein the polyfunctional amino moiety is selected from the group consisting of methylolated glycoluril, urea and urea containing moieties.

5. The crosslinking agent of claim 1 wherein the polyfunctional amino moiety is selected from the group consisting of melamine, melamine-formaldehyde and glycourilformaldehyde.

6. The crosslinking agent of claim 5 wherein the —L— group comprises CH$_2$, CHR'", or CHR'CHR"—, where R' R" and R'" are hydrogen or an alkyl group and L further comprises additional bridging groups selected from the group consisting of esters, ethers, ureas and urethane groups.

7. A crosslinking agent according to claim 1 wherein L further comprises bridging groups selected from the group consisting of esters, ethers, ureas and urethane groups.

8. A crosslinking agent comprising a polyfunctional amino moiety and one or more carbamate groups and having the formula

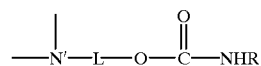

wherein N' is a polyfunctional amino moiety selected from the group consisting of melamine compounds, and the reaction products of melamine compounds with aldehydes, and condensates thereof, L comprises an alkyl group having a carbon chain length between 1 and 6 carbon atoms, and R is hydrogen.

* * * * *